United States Patent
Stoll et al.

[11] Patent Number: 6,056,111
[45] Date of Patent: May 2, 2000

[54] BLADE HOLDER FOR CONVEYOR BELT REVERSIBLE SCRAPER BLADE

[75] Inventors: Richard D. Stoll, Huntington, W. Va.; Lewis D. Stoll, Port Byron, Ill.; Christopher S. Smith, Huntington, W. Va.

[73] Assignee: Richwood Industries, Inc., Huntington, W. Va.

[21] Appl. No.: 09/217,794

[22] Filed: Dec. 21, 1998

[51] Int. Cl.[7] .................................................. B65G 45/00
[52] U.S. Cl. .......................... 198/497; 198/499; 198/498
[58] Field of Search ................................. 198/477, 478, 198/479

[56] References Cited

U.S. PATENT DOCUMENTS

| 4,344,525 | 8/1982 | Bancroft et al. | 198/497 X |
| 4,402,394 | 9/1983 | Stoll | 198/499 |
| 4,533,036 | 8/1985 | Gordon | 198/499 |
| 4,696,388 | 9/1987 | Stoll | 198/499 X |
| 4,969,553 | 11/1990 | Stoll | 198/499 |
| 5,218,412 | 6/1993 | Martin | 198/497 X |
| 5,657,853 | 8/1997 | Pennino | 198/499 |

FOREIGN PATENT DOCUMENTS 2205804A 12/1988 United Kingdom.

*Primary Examiner*—Christopher P. Ellis
*Assistant Examiner*—Gene O. Crawford
*Attorney, Agent, or Firm*—Biebel & French

[57] ABSTRACT

A reversible belt scraper blade is supported on the support arms of a belt scraper by attachment fittings that permit the blade to be rotated, in place, while the weight of the blade is carried on the belt scraper arms.

3 Claims, 2 Drawing Sheets

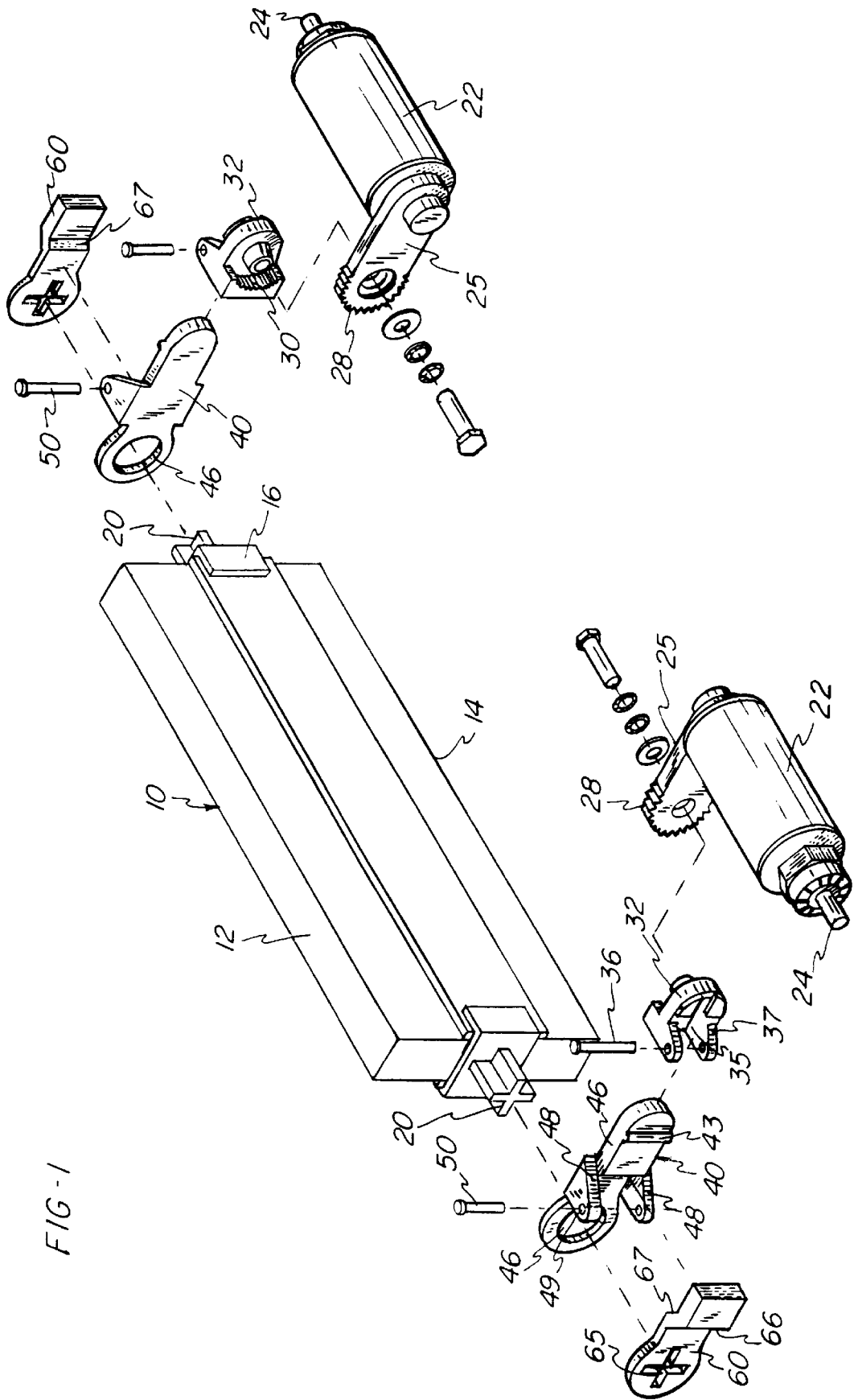

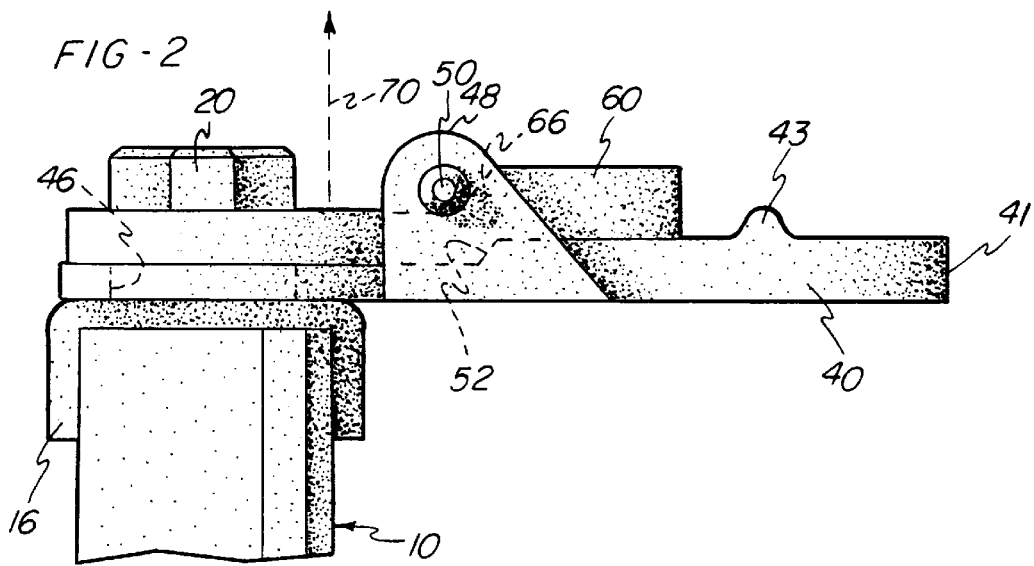
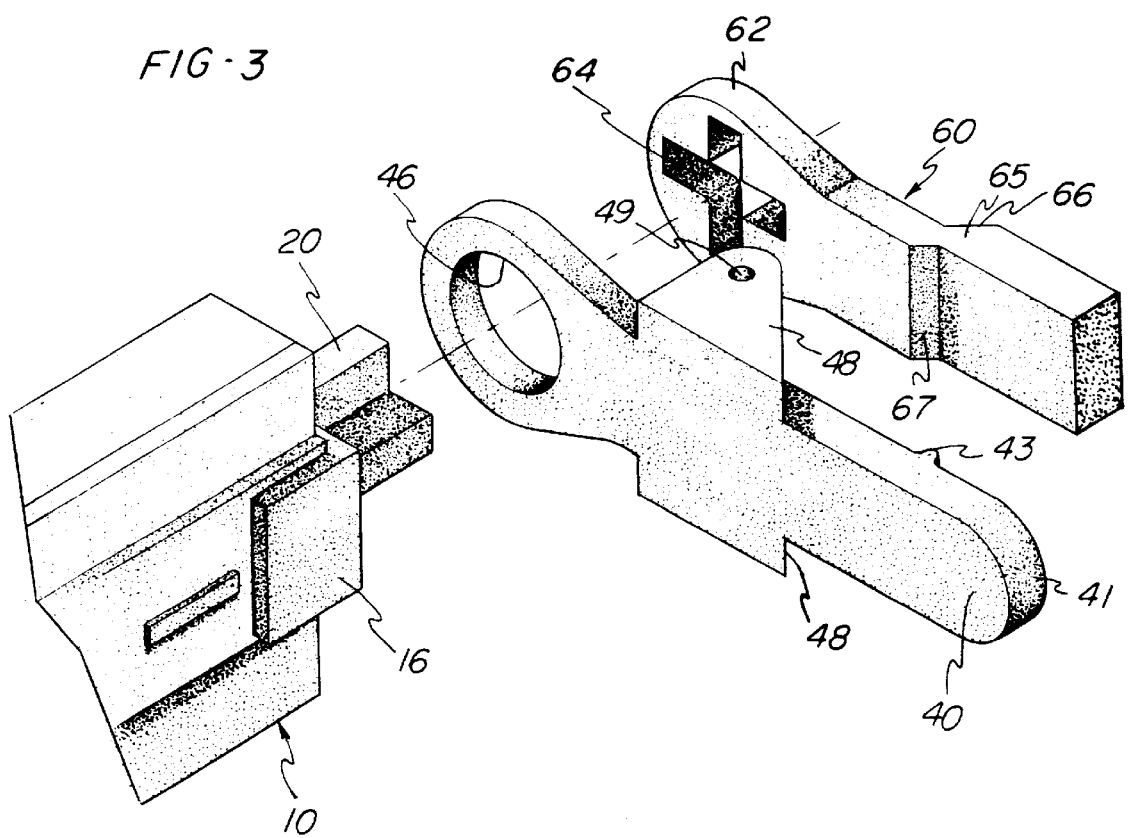

BLADE HOLDER FOR CONVEYOR BELT REVERSIBLE SCRAPER BLADE

BACKGROUND OF THE INVENTION

This invention relates to conveyor belt scraper blade assemblies, and particularly such assemblies incorporating scraper blade support arms that permit a reversible scraper blade to be repositioned in place, while the scraper blade remains supported on the support arms.

Adjustable conveyor belt scraper systems that support belt scraper blades in a continuous cleaning relation to an outer return surface of a conveyor belt are shown in Stoll U.S. Pat. No. 4,969,553 issued Nov. 13, 1990 and U.S. Pat. No. 4,402,394 issued Sep. 6, 1983, the disclosures which are incorporated herein by reference.

The belt scraper assemblies, as shown in each of the Stoll patents, are designed to accept scraper blades that have non-circular mounting studs formed at their respective ends. The blades may be reversed to present a new scraper surface to the belt when the original surface is worn. A particularly advantageous reversible blade is disclosed in Stoll U.S. Pat. No. 5,628,392 issued May 13, 1997, which patent is also incorporated herein by reference. The patent of Stoll '392 describes and claims a reversible scraper blade that is designed to be reversed in place, simply by rotating the blade through 180 degrees, rather than also requiring the blade to be switched from end-to-end on the support arms.

Scraper blades for large industrial conveyor belts are necessarily heavy in weight. A blade 100 inches long may weigh as much as 200 pounds. The conventional apparatus for supporting such blades require that the blade itself be removed from its supporting arms or structure, then rotated to present the new wearing surface to the belt, and then reattached. When the blade is freed from the support arms, the weight of the blade must be supported by some means, usually by two persons, one at each side of the belt who must hold the blade, rotate it through 180 degrees, then replace the blade into its support structure. In the case of the blades as shown in the above-identified Stoll patent, the blade supporting stud has a cruciform cross section and must be replaced into a blade holder having a complimentary opening. Such a renewal and replacement process is difficult, not only because of the weight of the blades, but because of the necessity of having to operate in awkward positions and close quarters.

A requirement of any apparatus designed to support the weight of such a blade while it is being rotated in place is that the torque transmitting components must come readily free from the blade supporting arms without jamming or binding. In an arrangement where torque is transmitted through coupling members, any binding that impedes or prevents the release of the blade from the support, to permit in-place rotation, puts the maintenance personnel at risk or, at the least, impedes their performance and increases the time required to make such a change. Further, any such torque transmitting components must, by design, be capable of supporting the scraper blade over long periods of time and under rugged conditions of use, and yet be easily removable for blade rotation.

SUMMARY OF THE INVENTION

This invention relates to conveyor belt scraper blade assemblies and particularly such assemblies including blade supporting arrangements by which the blade may be rotated, in place, to present a new wearing surface to a belt, while supporting the weight of the blade. More particularly, the invention relates to a blade supporting arrangement by which a belt scraper blade having a non-circular axially extending support stud, is supported in place on a base piece that has a generally circular opening that allows it to support the scraper blade at the stud and at the same time permit the blade to rotate freely about its axis within such opening, so that a new working edge of the blade to be brought into place. A retainer part is removably mounted on the base piece and has an opening conforming to the shape of the stud. When assembled with the stud extending through the respective openings, the retainer is secured on the base piece in such a manner that torque is transmitted from the blade through the base piece to the support arms without binding of the retainer to the base piece. The entire blade support assembly is mounted into the existing adjustable blade support knuckles of the conveyor belt scraper assemblies, made according to the teaching of the above-identified Stoll patents.

In a preferred embodiment, a plate-like base piece is formed with one end adapted to be received within the adjustable support knuckle of the blade arm of the scraper apparatus. The base piece has a remote end formed with a generally circular opening through which the blade mounting stud extends. The opening forms a relatively close fit with the stud permitting the blade to be rotated therein while the blade weight is supported on the scraper apparatus. The base piece is formed with a pair of upstanding bosses or ears, one on each side, forming a channel shaped space in which the retainer is removably received. The blade retainer is in the form of a plate and forms a close fit between the channel-defining bosses. The blade retainer plate has a remote end that is positioned in immediate overlying relation to the remote end of the base piece and is formed with a shaped opening adapted to receive the non-circular blade mounting stud, and transmits torque from the stud to the base piece. Preferably, the stud has a cruciform shape and the retainer plate opening is complimentary.

Cooperating and mating offsets are formed in the base piece and the retainer. The offsets have inclined surfaces that transmit torque and thrust from the blade retainer to the base piece. A transverse retainer pin is assembled through openings in the upstanding bosses and in close relation to the outer or exposed surface of the retainer. The upper or exposed surface on the retainer is likewise formed with an offset that forms a bounding surface against the retainer pin. The arrangement is such that torque induced moments tending to rotate the retainer plate are transmitted simultaneously to the support plate through the mating inclined surfaces and to the retainer pin at the opposed outer inclined surface of the retainer. In this manner, torque is transmitted without binding of the parts, since the torque transmission is over a substantial area, and no single small area is required for transmission that could create a binding condition.

The retainer is easily removed by withdrawing the retainer pin and sliding the retainer axially off of the blade stud while the blade stud remains supported on the walls of the generally circular opening of the base piece. The blade may now be rotated in place, the retainer may be reassembled and the retainer pin reinserted.

It is accordingly an important object of the invention to provide a blade holder by which a belt cleaner scraper blade is supported in an operative position and by which an unused blade edge may be introduced to the belt while the blade is supported on the blade support arms, by rotating the blade about its axis.

A further object of the invention is the provision of a belt cleaner blade support assembly, as outlined above, including a base piece connected to the belt scraper support arms and provided with an aperture for supporting and permitting rotation of the support stud of the blade, in combination with a blade retainer plate that is mounted by a keeper pin on the base plate and which is in mechanical engagement with the blade support stud and held in position on the base plate until the keeper pin is removed, and providing for the transmission of torque from the blade to the belt scraper arm without binding of the parts.

A further object of the invention is the provision of a scraper blade retainer assembly, as outlined above, in which a base piece is formed with a pair of upstanding bosses, defining a channel shaped space, and in which a retainer plate is formed as a close fit between such bosses and contiguous with the base piece, and in which each of these parts has a mutually inclined offset for capturing the retainer plate between the bosses when a retainer pin is inserted.

Other objects and advantages of the invention will be apparent from the following description, the accompanying drawings and the appended claims.

BRIEF DESCRIPTION OF THE DRAWINGS

FIG. 1 is an exploded view of the components of the improved blade holder of this invention shown in relation to a scraper blade and to an adjustable scraper blade support arrangement;

FIG. 2 is a plan view of the improved blade holder with a blade stud inserted therein, and;

FIG. 3 is an prospective exploded view of components illustrated in FIG. 2.

DETAILED DESCRIPTION OF THE PREFERRED EMBODIMENT

Referring to the Figures of the drawing, which illustrated preferred embodiment of the invention, a reversible belt scraper blade 10 is shown in FIG. 1. The blade 10 may be constructed according to the teachings of Stoll et al. U.S. Pat. No. 5,628,392. This blade is provided with opposed blade scraping surfaces 12 and 14, and is illustrated in a position in which surface 12 would be in contact with the lower surface of an overriding belt within the belt scraper.

Blade and brackets 16 support the blade on opposite ends, and are formed with non-circular mounting studs 20, such as the preferred cruciform-shaped studs shown. These studs extend transversely of the direction of the movement of a belt, and axially of the length of the blade 10. The blade 10 is of such a design that the unused surface may be brought into play simply by rotating the blade about the axis defined by the studs 20.

The invention is shown as being applied to an existing belt scraper actuator such as the single blade scraper belt, the Model Combi-T-1c belt scraper manufactured by Richwood Industries, Inc. of Huntington, W. Va. 25714, although the components of the invention may be applied equally to a twin belt scraper such as shown, for example, in the Stoll U.S. Pat. No. 4,969,553. In the Model Combi-T-1c belt scraper essentially identical cylindrical bushings supports 22 are mounted in immovable relation to a belt scraper frame, not shown. The members 22 are formed with a though-shaft 24 by which torque may be applied by pneumatic actuators, not shown, for the purpose of rotating the shafts 24 and biasing output arms 25 in a direction such at to lift the blade 10 against an overrunning belt.

The arms 25 are provided, at there ends, with sector teeth 28 and are selectively and adjustably engaged mating teeth 30 in adjustable knuckles 32. The knuckles 32 provide the means by which the position of the blade 10 may be initially set with respect to the arms 25. The biasing force applied to each of the arms 25 may be independently controlled by separate pneumatic actuators, not shown, connected to rotate the shafts 24.

The knuckles 32 are provided with sockets 35 for receiving a blade support plate with a cruciform shape opening (such as shown at reference numbers 18 and 20 in U.S. Pat. No. 4,969,553) and for retaining the plate in the socket by a pin 36 that extends across the socket opening through socket ears 37.

The present invention takes advantage of the arrangement described above for providing an assembly that supports a reversible belt scraper blade and providing for the renewal of the scraper surface simple by rotating the blade while the weight of the blade is supported by the knuckles 35 and the arms 25. For this purpose, the invention includes an elongated plate-like base piece 40, FIGS. 1–3. The base piece 40 has a body formed with an inner curved end 41 adapted particularly to be received in the socket 35 of the knuckle 32. When so inserted, a protuberance 43 formed on the outside face of the retainer piece 40 is captured inwardly of the retainer pin 36, previously described. Accordingly, the retainer plate is supported on the knuckle 32 in a more or less fixed condition, and need only be removed at such time as it becomes necessary to replace the entire blade 10.

The base piece 40, at its outer end is formed with a circular opening 46 of a diameter to receive the stud 20 therein and to support the blade for rotation when the working surface of the blade is to be renewed. The piece 40 intermediate its ends is formed with a pair of laterally spaced upstanding ears or bosses 48 that are apertured 49 to receive a linch pin 50 therethrough. Also, the outer face of the base piece 40 is formed with a transverse inclined planar offset 52 as shown in phantom and FIG. 2. The position of the offset 52 on the outer face of the plate is rearwardly of the transverse axis of the openings 49 formed in the bosses 48.

The base piece 40 cooperates with a retainer plate 60. The plate 60 has an outer end 62 in which a cruciform opening 64 is formed, to conform to the shape of the stud 20 when the stud 20 is inserted through the opening 46. This condition is shown in FIG. 2.

The retainer plate 60 has a body dimensioned to be received within the space between the bosses or ears 48 of the base plate, and is similarly formed with a planar offset at 65 defined by an outer inclined surface 66 and an inner parallel inclined surface 67. The surface 67 is configured to mate with the surface 52, while the outer surface 66, shown in phantom in FIG. 2, forms a backup embutment for the pin 50, preventing outward or rotational movement of the retainer plate 60 on the base piece 40 when the linch pin 50 is inserted, as shown in FIG. 2. The planar surface 66 forms an inclined wall that defines a bounding surface against the pin 50 while torque forces are transferred by the retainer plate 60 to the base piece 40 by force of the retainer plate body directly against the inner surfaces of the ears and by mutual engaging forces between the respective inclined surfaces 52 and 67. In this manner, the rotational torque applied through the cruciform stud 20 to the walls of the opening 64 are transferred to the base piece 40 through substantial surface contact and any tendency of these pieces to jam or lock together is avoided.

In further explanation, the transverse inclined planar offset 52 on the base piece 40 may be considered as a first offset while the mating planar offset or outer inclined surface 67 on the retainer plate 60 may be considered as a second offset that is configured to mate or match with the planar surface 52 thereby forming a pathway by which torque moments are transferred between the base piece and the retainer plate. The plan of the mating offsets is substantially parallel with the outer inclined surface 66 and are positioned, as is the surface 66, inwardly of the axis of the linch pin openings 49. Thus, when the linch pin is in place, the retainer plate is fully captured while torque applied between the blade and the knuckles 32 is distributed over a substantially wide area of contacts, particularly the contacts defined between the mutually inclined surfaces.

In the operation of the invention, the blade 10 will normally be supported in position as shown in FIG. 2. When it is desired to rotate the blade to present one of the other working surfaces 12 or 14 to the belt, it is only necessary to withdraw the linch pin 50 from the openings 49 in the ears 48 and then withdraw the retainer plate 60 in the direction of arrow 70 (FIG. 2) leaving the blade suspended on the base piece 40. At this time, the blade may easily be rotated in place, while the entire weight of the blade is supported in the opening 46, through 180 degrees, and then the retainer plate is reassembled into the position shown in FIG. 2, and the pin 50 reinserted. This is accomplished then by removing only four parts: two pins 50, and two retainer plates 60. This can easily be practiced by two persons, one on each side of the belt cleaning system, with each person working directly in front of himself/herself, without the necessity for having to support the weight of the blade during the repositioning.

The arrangement of the parts is such that rotational forces are distributed over a wide area of conjunction between the respective parts 40 and 60 so that the parts do not become wedged or jammed in use.

At such time as it becomes necessary to replace the blade 10 in its entirety, then the knuckle pins 36 may be extracted, releasing the base pieces 40 and thereby releasing the entire blade from the blade support arm system.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An assembly for supporting a reversible belt scraper blade on the support arms of a belt scraper and providing for renewal of the belt scraping surface by rotating the scraper while supporting the blade on the belt scraper arms, in which the blade is formed with non-circular axially extending mounting studs on the ends thereof by which the blade is mounted and secured against rotation on the belt scraper arms, comprising:

an elongated base piece having a plate-like body and an inner end adapted to be received and mounted on an arm of the belt scraper and having an outer end, said outer end having therein a generally circular opening therethrough adapted to receive the support stud of a belt scraper blade therethrough permitting rotation of the blade with respect to said base piece, said base piece intermediate said ends having a pair of laterally spaced upstanding bosses defining with said body, generally a U-shaped space, said bosses being apertured to receive a linch pin extending transversely of said space, a retainer plate having an inner end and a remote end, said retainer plate inner end being dimensional to fit within said U-shaped space between said bosses on base piece bosses, said retainer plate remote end having formed therein a shaped opening corresponding to the shape of a blade mounting stud and in axis alignment with said opening in said base piece, such that when such stud is extending through the said openings in said retainer plate and base piece, that rotational torques applied to the blade are transmitted by the blade stud to said retainer plate, said retainer plate, on an outer surface thereof in said U-shaped space, having an inclined wall positioned as a bounding surface against such retainer pin, preventing withdraw of said retainer plate from said base piece when a linch pin is inserted in said boss apertures.

2. The assembly of claim 1 further comprising means on said base piece body in said U-shaped space defining a first offset, means on an inner surface of said retainer plate forming a second offset that mates with said base piece offset, said offsets being positioned inwardly of the axis of said linch pin and forming a pathway by which torque moments are transferred between said base piece and said retainer plate.

3. The assembly of claim 2 in which said first and second offsets are defined by planar inclined mating surfaces, and said mating surfaces are generally parallel to said inclined wall.

* * * * *